(12) United States Patent
Bohm et al.

(10) Patent No.: US 10,622,142 B2
(45) Date of Patent: Apr. 14, 2020

(54) CONCRETE-EMBEDDED WIRELESS POWER TRANSFER COIL

(71) Applicants: Ryan J. Bohm, Logan, UT (US); Trevor G. Gardner, Logan, UT (US); Marvin Halling, Logan, UT (US); Baljit S. Riar, Logan, UT (US); Regan Zane, Hyde Park, UT (US)

(72) Inventors: Ryan J. Bohm, Logan, UT (US); Trevor G. Gardner, Logan, UT (US); Marvin Halling, Logan, UT (US); Baljit S. Riar, Logan, UT (US); Regan Zane, Hyde Park, UT (US)

(73) Assignee: Utah State University

( * ) Notice: Subject to any disclaimer, the term of this patent is extended or adjusted under 35 U.S.C. 154(b) by 0 days.

(21) Appl. No.: 15/716,358

(22) Filed: Sep. 27, 2017

(65) Prior Publication Data
US 2018/0151293 A1 May 31, 2018

Related U.S. Application Data

(60) Provisional application No. 62/399,922, filed on Sep. 26, 2016.

(51) Int. Cl.
*H01F 38/14* (2006.01)
*H01F 27/28* (2006.01)
(Continued)

(52) U.S. Cl.
CPC ............. *H01F 38/14* (2013.01); *B60L 5/005* (2013.01); *B60L 53/12* (2019.02); *E01C 9/00* (2013.01); *E01C 23/00* (2013.01); *H01F 27/2823* (2013.01); *H01F 27/32* (2013.01); *H01F 41/04* (2013.01)

(58) Field of Classification Search
CPC ...... H01F 38/14; H01F 27/2823; H01F 27/32; H01F 27/288; H01F 27/2885; H01F 27/365; H01F 27/346; H01F 27/362; H01F 41/04; H01F 2017/008; E01C 23/00; E01C 9/00; B60L 11/1837; B60L 53/12; B60L 5/005
USPC ................. 336/200, 232, 223; 320/108–109; 307/104
See application file for complete search history.

(56) References Cited

U.S. PATENT DOCUMENTS

| | | |
|---|---|---|
| 3,808,569 A | 4/1974 | Sheldon et al. |
| 8,913,952 B2 | 12/2014 | Ali et al. |

(Continued)

*Primary Examiner* — Mang Ting Bik Lian

(57) ABSTRACT

The present disclosure covers apparatuses and associated methods for embedding a wireless power transfer coil in concrete. In embodiments, a wireless power inductor pad embedded in concrete includes a wireless power inductor pad comprising a first and second layer of continuously strung stranded wire, each layer arranged in a circular pattern. The first layer is positioned above the second layer such that the stranded wire of the first layer is offset vertically from the stranded wire of the second layer by a vertical wire-to-wire distance. Additionally, the first layer is offset horizontally from the second layer such that the stranded wire of the first layer is offset horizontally from the stranded wire of the second layer by a horizontal wire-to-wire distance; the horizontal wire-to-wire distance being zero inches. Finally, concrete permeates between the first and second layers and between the stranded wires of each layer.

5 Claims, 2 Drawing Sheets

(51) Int. Cl.
  *H01F 41/04* (2006.01)
  *E01C 23/00* (2006.01)
  *H01F 27/32* (2006.01)
  *E01C 9/00* (2006.01)
  *B60L 5/00* (2006.01)
  *B60L 53/12* (2019.01)

(56) References Cited

U.S. PATENT DOCUMENTS

| | | | |
|---|---|---|---|
| 2011/0287713 A1 | 11/2011 | Ali et al. | |
| 2012/0218068 A1* | 8/2012 | Yamakawa | H01Q 1/3225 336/90 |
| 2013/0181668 A1* | 7/2013 | Tabata | H01F 38/14 320/108 |
| 2013/0328412 A1* | 12/2013 | Meins | H01F 38/14 307/104 |
| 2014/0284159 A1* | 9/2014 | Boys | H01F 38/14 191/2 |
| 2015/0123489 A1 | 5/2015 | Niizuma | |
| 2015/0145634 A1* | 5/2015 | Kurz | H01F 38/14 336/232 |
| 2015/0170833 A1* | 6/2015 | Widmer | H01F 38/14 307/104 |
| 2015/0179335 A1* | 6/2015 | Oh | H01F 27/02 320/108 |
| 2015/0367739 A1* | 12/2015 | Boser | H01F 38/14 320/108 |
| 2016/0147965 A1 | 5/2016 | Matsumura et al. | |
| 2016/0156215 A1* | 6/2016 | Bae | H01Q 7/00 320/108 |
| 2016/0254706 A1* | 9/2016 | Saen | H02J 50/12 307/104 |
| 2017/0237295 A1* | 8/2017 | Yuasa | H01F 27/24 307/104 |

\* cited by examiner

CONCRETE-EMBEDDED WIRELESS POWER TRANSFER COIL

RELATED APPLICATIONS

This patent application claims the benefit of U.S. Provisional Application 62/399,922, filed Sep. 26, 2016 and entitled CONCRETED-EMBEDDED WIRELESS POWER TRANSFER COIL, which is incorporated herein by reference in its entirety.

TECHNICAL FIELD

The present disclosure relates to wireless power transfer coils, more particularly, to novel systems and methods for embedding a wireless power transfer coil in concrete.

BACKGROUND

Wireless power transfer coils may be embedded in concrete or roadways for the purpose of transferring electrical energy to a wireless power transfer coil in an automobile.

SUMMARY

This invention solves the problems of embedding wireless power transfer coils in a roadway or pathway. One of the methods for doing so is to add a thickness of particular materials around the coil so as to separate it from the material surrounding the coil (structural material) which acts as a degrading element to the performance of the coil. Another considerable concern with embedded coils is to maintain the strength characteristics of the structural material when the coil is placed within. One method proposed for increasing the strength is to alternatingly offset each winding vertically thus increasing the space between each coil but not increasing the overall diameter of the coil.

Another benefit of the offset coils is an optimization of the magnetic field shaping that occurs from the position of one coil relative to the other.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
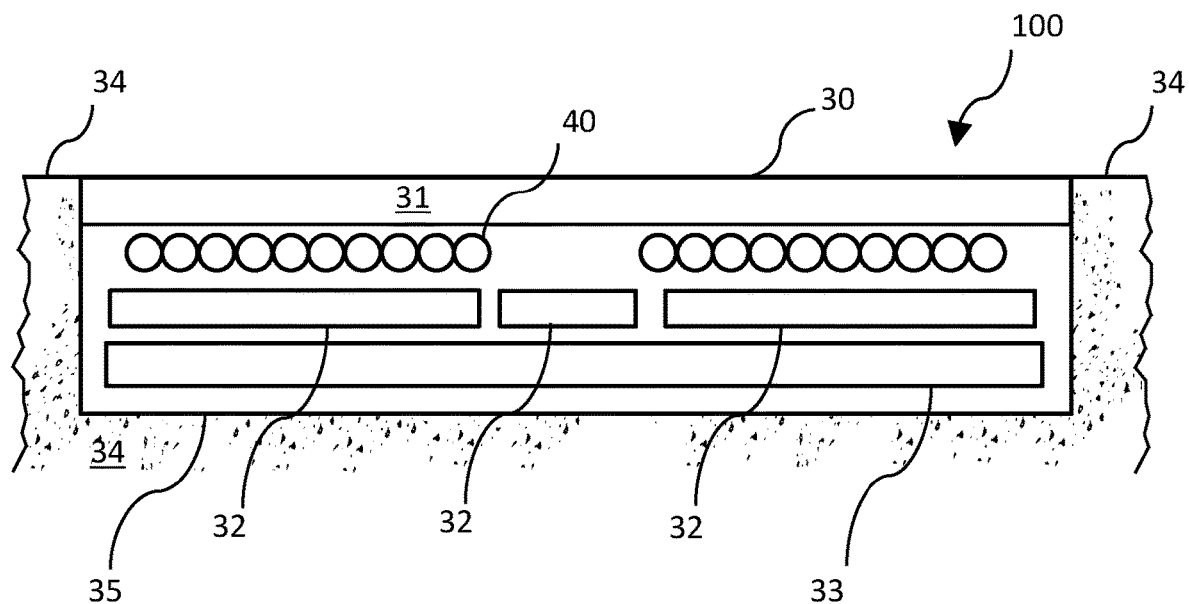
FIG. 1 illustrates a wireless power transfer coil assembly in a road or pathway.

The present disclosure covers apparatuses and associated methods for embedding a wireless power transfer coil in concrete. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

Figure 2:
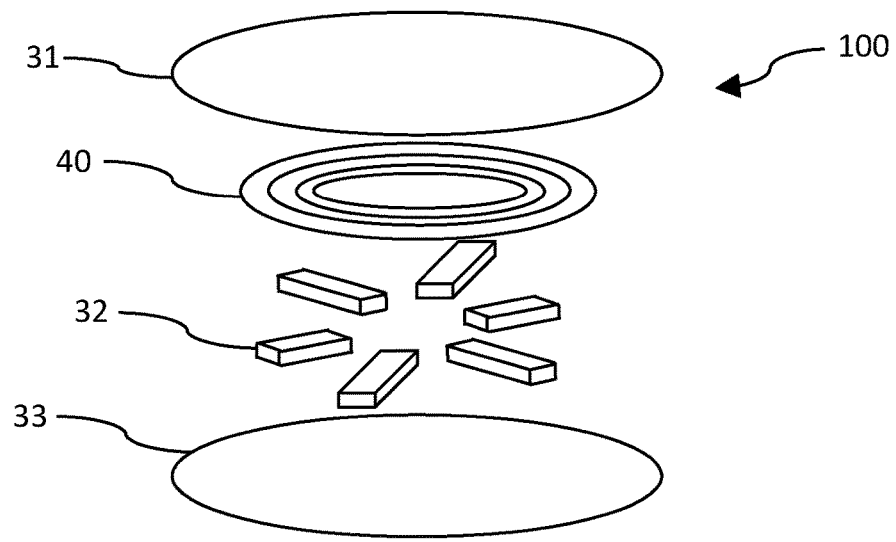
FIG. 2 illustrates and exploded view of the wireless power transfer coil assembly of FIG. 1.

FIG. 1 illustrates a wireless power transfer coil assembly 100 located in a road or pathway 34 where trucks, cars, or other heavy objects can impart significant loads onto the wireless power transfer coil. FIG. 2 shows and exploded view of a traditional wireless power transfer coil assembly 100. Traditional wireless power transfer coils are not embedded in concrete, but are instead located in a housing 35 with a cover 31. The cover 31 may be installed flush with the road or pathway surface 30. Other parts of the wireless power transfer coil assembly 100 include ferrite bars 32 and a shield plate 33. The cover 31 and housing 35 are designed to protect the wireless power transfer coil assembly 100 and redirect loads from heavy objects around the wireless power transfer coil assembly 100.

Because they are made of different materials, the cover 31 and housing 35 can be difficult to integrate with the road 34 or road surface 30 for long-term durability. The inventors of the present disclosure identified that it would be ideal if the cover 31 or housing 35 could be made from the same materials as the road 34, such as concrete. However, in order to do so, the inventors identified the need to design the coil such that loads imparted on the wireless power transfer coil assembly 100 could be transferred through the coil without damaging the stranded wire in the coil 40, or other parts of the wireless power transfer coil assembly 100, without compromising performance.

FIG. 1 illustrates a coil 40 arrangement where the coils are placed side-by-side without a gap between them. Coils 40 are placed side-by-side without a gap to increase the strength of the varying magnetic field created by the wireless power transfer coil assembly 100 and to minimize the circumference of the wireless power transfer coil assembly 100.

However, if embedded in concreted in this arrangement, coil 40 would create gap between a top and bottom layer of concrete above and below the coil 40. Loads applied to the top layer of concrete would transfer through the more flexible stranded wire in the coil 40, causing the top layer of concrete to eventually crack or otherwise degrade.

One possible solution tested by the inventors of the present disclosure was to embed a wireless power transfer coil directly into a concrete slurry and have the concrete cure around each of the individual stranded wires that make up the coil. The inventors tested wireless power transfer coils made of litz wire. Other types of stranded wire may also be used. When first embedded in a concrete slurry, the coil resistance increased by more than 100 times and the inductance decreased by more than 100 times. The increase in resistance and decrease in inductance was unexpected. In order to function properly, a wireless power transfer coil should retain minimum resistance and high inductance. The inventors expected no changed in resistance or inductance because the litz wire and the individual litz fibers within the litz wire are insulated. The inventors found that as the concrete cured, the resistance through the wireless power transfer coil decreased but still remained orders of magnitude higher than the original coil before it was imbedded into the concrete slurry. This post-cure high resistance and low inductance was also unexpected.

Embodiments of the present disclosure solve the resistance and structural load problem created by placing a wireless power transfer coil directly in a cement slurry. Through experimentation and testing of various configurations, the inventors found that increasing the thickness and integrity of the insulating material around offset stranded wires substantially reduced the effect of the increased resistance and reduced inductance.

Figure 3A:
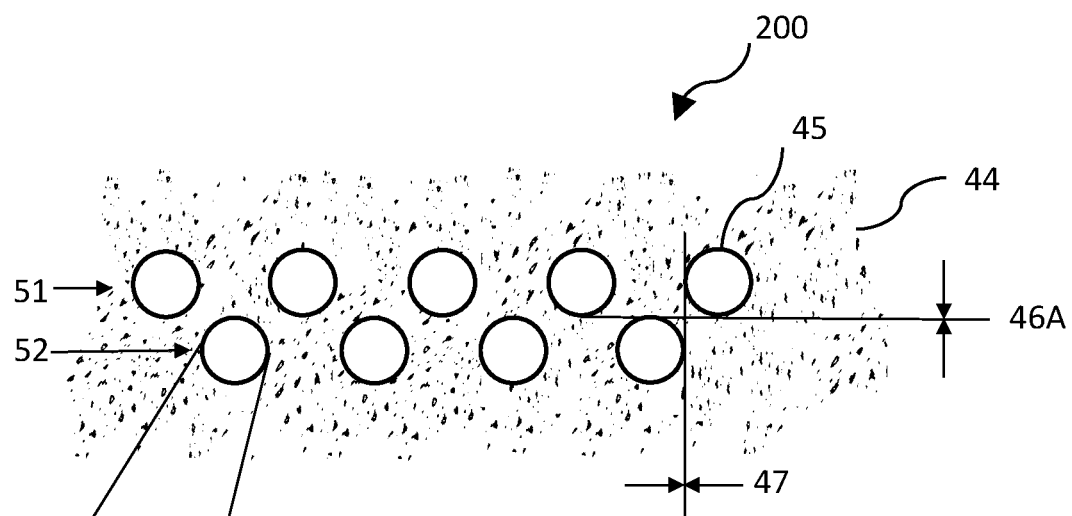
FIG. 3A illustrates a portion of a wireless power transfer coil embedded in a concrete structure.

FIG. 3A illustrates an embodiment of the present disclosure where a portion of a wireless power transfer coil 200 of individual stranded wires 45 are embedded in a concrete structure 43. FIG. 3 illustrates a first and second layer, 51 and 52, respectively, of continuously strung stranded wire 45. The first 51 and second 52 layers are arranged in a circular pattern, where the first layer 51 is position above the second layer 52 such that the stranded wire 45 of the first layer 51 are offset vertically by a vertical wire-to-wire distance 46A. In this embodiment, the stranded wires 45 are vertically offset with a center-to-center distance equal to the stranded wire diameter such that the vertical wire-to-wire distance 46A is zero inches. Similarly, the stranded wires 45 between the first layer 51 and the second layer 52 are horizontally offset with a center-to-center distance equal to the stranded wire diameter such that the horizontal wire-to-wire distance 47A is zero inches. The horizontal wire-to-wire distance 47A minimizes the coil circumference. The vertical wire-to-wire distance 46A allows the concrete mixture 44 to more readily flow between the stranded wires 45 to create a continuous structure of concrete 44 through the coil 200. The continuous concrete 44 flow through the coil 200 acts to transfer any load place on top of the coils 200 to below the coil 200.

Figure 3B:
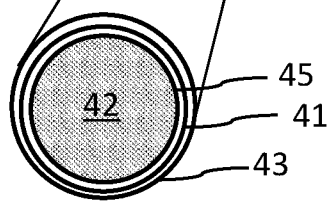
FIG. 3B illustrates an insulated stranded wire.

FIG. 3B illustrates a magnified view of an example stranded wire 45 with litz fibers 42. The stranded wire 45 used by the inventors in tests contained 1,650 strands (or fibers) of 38-AWG strands with a double-nylon jacket wrap 41. Additionally, the individual litz strands 42 were insulated (not shown). Other types of stranded, litz, or non-litz wire could be used as well to optimize the performance. Stranded wire 45 has additional insulation 43, which increased the distance between litz fibers 42 and the structural material or concrete 44. In one embodiment, the inventors enveloped the stranded wires 45 in a layer of water-resistant polyolefin heat-shrink (additional insulation 44). At 20 kHz AC-coil operation, the insulation thickness was between approximately 0.015 to 0.035 inches, although other thicknesses outside of this range could be optimal under various conditions. The thickness of insulation 43 was sufficient such that the litz fibers 42 are spaced a distance from the cement or structural material 44. The inventors believe that this increased distance reduced the dissipation factor of the cement or structural material 44 so as to minimally impact the resistance of the stranded wire 45 in the coil 200.

Figure 4:
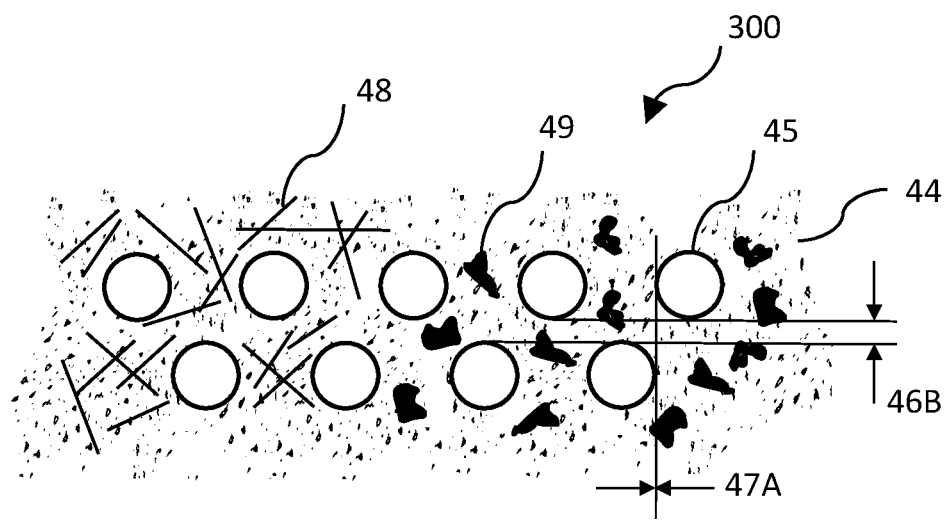
FIG. 4 illustrates a portion of a wireless power transfer coil embedded in another concrete structure.

A vertical wire-to-wire distance can vary to accommodate structural and magnetic benefits. FIG. 4 illustrates another vertical wire-to-wire distance 46B. In this embodiment, vertical wire-to-wire distance 46B is about one-fourth the diameter of the stranded wire 45. Other offset distances are possible. As described below, the vertical wire-to-wire distance 46B may be increased to allow for the insertion of strengthening materials within cement or structural material 44.

Other materials may be added to the concrete or structure material 44 to strengthen the concrete or structure material 44 or otherwise better transfer a load from above the coil 300 to below the coil 300. For example, FIG. 4 illustrates glass fiber 48 or large aggregate 49 embedded into the concrete or structural material 44. The glass fiber is an alkali-resistant glass fiber and the concrete or structure material also contains a polymer admixture. The large aggregate is generally greater than $3/8$ inches.

Glass fiber 48 or large aggregate 49 can increase the compressive strength of the concrete or structural material 44. In embodiments, the combined glass fiber 48 and concrete slurry 44 or aggregate 49 and concrete slurry 44 may need to be hand-packed between the stranded wires 45 to avoid large air-pockets between the stranded wires 45. Alternatively, or additionally, the combined glass fiber 48 and concrete slurry 44 or aggregate 49 and concrete slurry 44 may be vibrated immediately after being poured to fill-in any pockets between the stranded wires 45.

What is claimed is:

1. A wireless power transfer coil assembly embedded in concrete, comprising:
    a wireless power coil comprising a single continuously strung stranded wire, wherein each strand is an individually insulated 38-AWG strand and the stranded wire comprises a double nylon jacket wrap, the stranded wire organized in a first layer and a second layer, each layer arranged in a circular pattern, wherein:
    the first layer is positioned above the second layer such that the stranded wire of the first layer is offset vertically from the stranded wire of the second layer by a vertical wire-to-wire distance, wherein the vertical wire-to-wire distance between a bottom of the stranded wire in the first layer and a top of the stranded wire in the second layer is at least zero inches;
    the first layer is offset horizontally from the second layer such that the stranded wire of the first layer is offset horizontally from the stranded wire of the second layer by a horizontal wire-to-wire distance, the horizontal wire-to-wire distance being zero inches;
    from an outside of the wireless power coil, the stranded wire is in one of the first layer and the second layer, each next inner more instance of stranded wire toward a center of the wireless power coil is in the other of the first layer and the second layer from the outer more stranded wire and horizontally offset from an outer more stranded wire by the horizontal wire-to-wire distance, and each stranded wire in a given layer is offset from each adjacent stranded wire in the given layer by at least a stranded wire diameter; and
    concrete permeating between the first and second layers and between the stranded wires of each layer.

2. The wireless power inductor pad of claim 1, wherein the stranded wire is insulated with a water-resistant insulation with a thickness greater than 0.015 inches.

3. The wireless power inductor pad of claim 1, wherein the vertical wire-to-wire distance is greater than one fourth the diameter of the stranded wire.

4. The wireless power inductor pad of claim 1, wherein the concrete permeating between the first and second layers and between the stranded wires of each layer contains glass fibers.

5. The wireless power inductor pad of claim 1, wherein the concrete permeating between the first and second layers and between the stranded wires of each layer contains aggregate greater than 3/8 inches in size.

* * * * *